United States Patent
Bnaya

(10) Patent No.: US 12,084,068 B2
(45) Date of Patent: Sep. 10, 2024

(54) CONTROL OF VEHICLE AUTOMATED DRIVING OPERATION WITH INDEPENDENT PLANNING MODEL AND COGNITIVE LEARNING MODEL

(71) Applicant: GM GLOBAL TECHNOLOGY OPERATIONS LLC, Detroit, MI (US)

(72) Inventor: Zahy Bnaya, Petach Tikva (IL)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 17/835,035

(22) Filed: Jun. 8, 2022

(65) Prior Publication Data
US 2023/0398997 A1    Dec. 14, 2023

(51) Int. Cl.
*B60W 50/00*  (2006.01)
*B60W 60/00*  (2020.01)
*G05B 13/02*  (2006.01)

(52) U.S. Cl.
CPC .......... *B60W 50/00* (2013.01); *B60W 60/001* (2020.02); *G05B 13/0265* (2013.01); *B60W 2050/0028* (2013.01)

(58) Field of Classification Search
CPC ............... B60W 50/00; B60W 60/001; B60W 2050/0028; G05B 13/0265
USPC ...... 701/25, 27, 140, 159, 481, 524; 706/13, 706/15, 23, 43; 703/4, 93; 700/48
See application file for complete search history.

(56) References Cited

U.S. PATENT DOCUMENTS

| | | | | |
|---|---|---|---|---|
| 11,243,532 B1 * | 2/2022 | Levihn | .................... | G06N 3/08 |
| 11,640,562 B1 * | 5/2023 | Badithela | ................ | G06N 7/01 |
| 2010/0106603 A1 * | 4/2010 | Dey | ................. | G08G 1/096811 |
| 2015/0379428 A1 * | 12/2015 | Dirac | ..................... | G06N 20/00 |
| 2018/0181860 A1 * | 6/2018 | Verbist | ................. | B60W 40/09 |
| 2021/0294340 A1 * | 9/2021 | Zhou | ................... | G05D 1/0217 |

(Continued)

FOREIGN PATENT DOCUMENTS

JP        6691158 B2 *   4/2020   ............. G06N 20/00

OTHER PUBLICATIONS

C. Lu, F. Hu, D. Cao, J. Gong, Y. Xing and Z. Li, "Transfer Learning for Driver Model Adaptation in Lane-Changing Scenarios Using Manifold Alignment," in IEEE Transactions on Intelligent Transportation Systems, vol. 21, No. 8, pp. 3281-3293, Aug. 2020 (Year: 2020).*

*Primary Examiner* — Elaine Gort
*Assistant Examiner* — Ellis B. Ramirez
(74) *Attorney, Agent, or Firm* — Quinn IP Law

(57) ABSTRACT

A method for controlling an automated driving operation includes setting up respective independent models for executing planning and learning in the automated driving operation, including a vehicle planning model and a cognitive learning model. A semantic layer is generated to act as a bridge between the cognitive learning model and the vehicle planning model, the semantic layer including a first data adaptor and a second data adaptor. The method includes transforming real traffic data to a respective equivalent abstract representation such that it can be used by the cognitive learning model to generate a humanized reward model, via the first data adaptor. The method includes determining a trajectory plan, via the vehicle planning model, based in part on the humanized reward model. The vehicle has a controller that executes the automated driving operation based in part on the trajectory plan.

15 Claims, 3 Drawing Sheets

(56) References Cited

U.S. PATENT DOCUMENTS

2022/0169277 A1* 6/2022 Itsui .................. G06N 20/00
2023/0133419 A1* 5/2023 Parasuram ........ B60W 50/0097
2023/0297958 A1* 9/2023 Takahashi ................ G06N 5/02

* cited by examiner

CONTROL OF VEHICLE AUTOMATED DRIVING OPERATION WITH INDEPENDENT PLANNING MODEL AND COGNITIVE LEARNING MODEL

INTRODUCTION

The present disclosure relates generally to a method and system for controlling an automated driving operation of a vehicle. Advanced driver assistance systems and autonomous vehicles generally incorporate various systems for efficient operation, such as blind spot information systems, lane departure warning systems and adaptive cruise control systems. The availability of human driving data that aids these assistance systems is expected to rise in volume, variety and richness. However, due to the complexity of the planning models, the various representations used by planners, drivers and other factors, using this data for controlling an automated driving operation of a vehicle is a non-trivial and challenging process.

SUMMARY

Disclosed herein is a method for controlling an automated driving operation of a vehicle having a controller with a processor and tangible, non-transitory memory. The method includes setting up respective independent models for executing planning and learning in the automated driving operation, including a vehicle planning model and a cognitive learning model. A semantic layer is developed or generated to act as a bridge between the cognitive learning model and the vehicle planning model, the semantic layer including a first data adaptor and a second data adaptor.

The method includes transforming real traffic data to a respective equivalent abstract representation such that it may be used by the cognitive learning model to generate a humanized reward model, via the first data adaptor. The method includes determining a trajectory plan, via the vehicle planning model, based in part on the humanized reward model. The controller executes the automated driving operation based in part on the trajectory plan.

In some embodiments, a Markov Decision Process model is employed in the semantic layer. The method may include obtaining pairs of state and action variables for the vehicle, via the vehicle planning model. The pairs of state and action variables are transformed to the respective equivalent abstract representation in the semantic layer, via the second data adaptor. The respective equivalent abstract representation is transmitted to the humanized reward model. The method may include incorporating a third data adaptor in the semantic layer and transmitting respective data from the humanized reward model to the vehicle planning model, via the third data adaptor.

In some embodiments, a two-alternative forced choice model or a multiple-alternative forced choice model is incorporated in the cognitive learning model. In other embodiments, an inverse reinforcement learning model is incorporated in the cognitive learning model. The cognitive learning model and the semantic layer may be hosted in an off-board cloud computing service.

The method may include employing quantile-binning in the cognitive learning model to discretize state features predetermined group of states into action variables. The method may include incorporating a neural network in the cognitive learning model with an activation function in an output layer, the activation function predicting a multinomial probability distribution.

Disclosed herein is a system for controlling an automated driving operation in a vehicle. The system includes a controller operatively connected to the vehicle, the controller having a processor and tangible, non-transitory memory on which instructions are recorded. A computing unit is in communication with the controller and has respective independent models for executing planning and learning in the automated driving operation, including a vehicle planning model and a cognitive learning model.

The computing unit includes a semantic layer adapted to act as a bridge between the cognitive learning model and the vehicle planning model. The semantic layer includes a first data adaptor and a second data adaptor. The first data adaptor is configured to transform real traffic data to a respective equivalent abstract representation such that it can be used by the cognitive learning model to generate a humanized reward model. The vehicle planning model is adapted to determine a trajectory plan based in part on the humanized reward model. The controller is adapted to execute the automated driving operation based in part on the trajectory plan.

The above features and advantages and other features and advantages of the present disclosure are readily apparent from the following detailed description of the best modes for carrying out the disclosure when taken in connection with the accompanying drawings.

Figure 1:
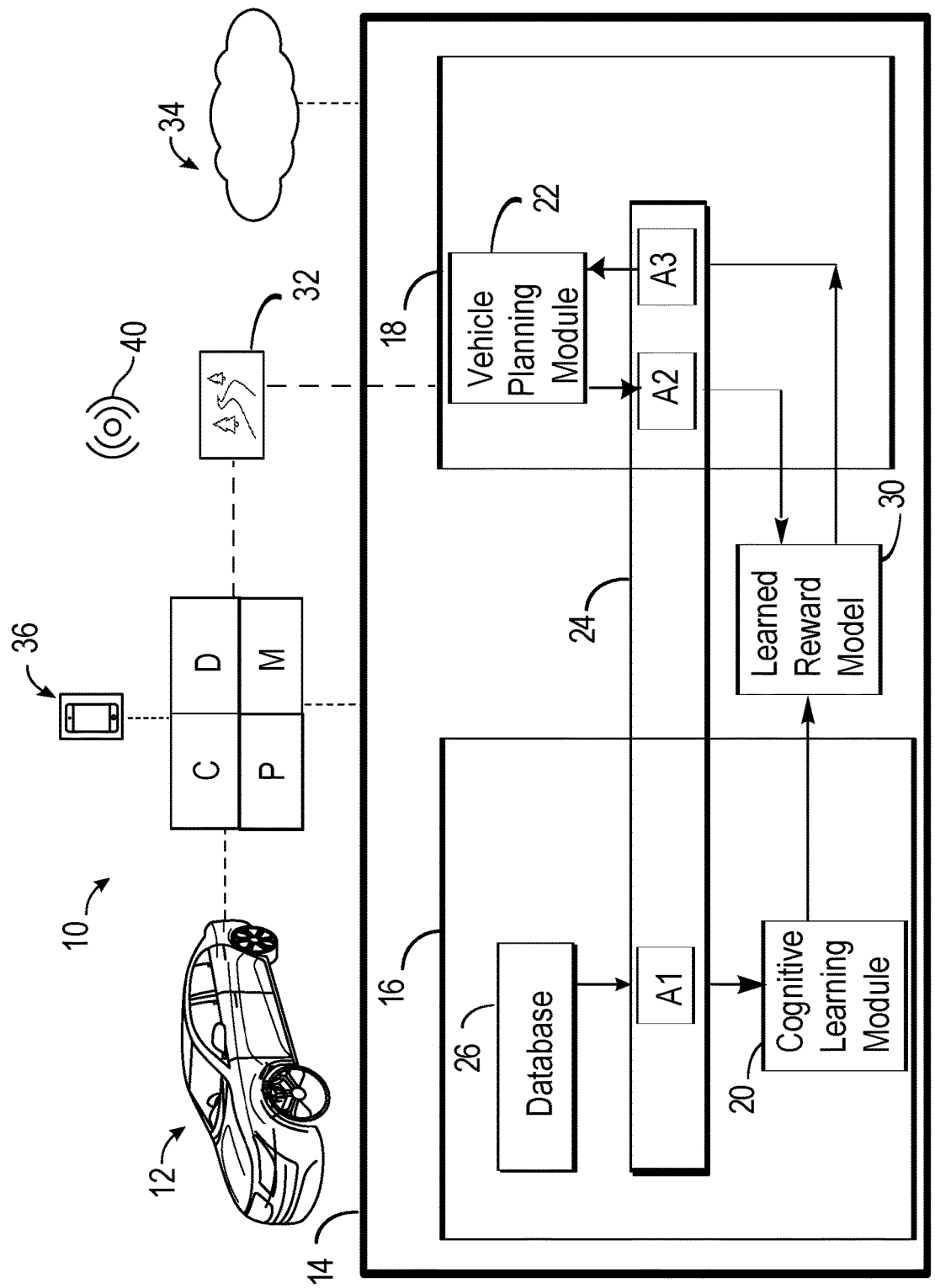
FIG. 1 is a schematic diagram of system for controlling an automated driving operation in a vehicle.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for controlling an automated driving operation D in a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, airplane and train. The vehicle 12 may be an electric vehicle, which may be purely electric or partially electric. It is to be understood that the vehicle 12 may take many different forms and have additional components.

Referring to FIG. 1, the vehicle 12 includes a controller C having at least one processor P and at least one memory M (or non-transitory, tangible computer readable storage medium) on which instructions may be recorded. A computing unit 14 is in communication with the controller C and includes a learning stage 16 and a planning stage 18.

Figure 2:
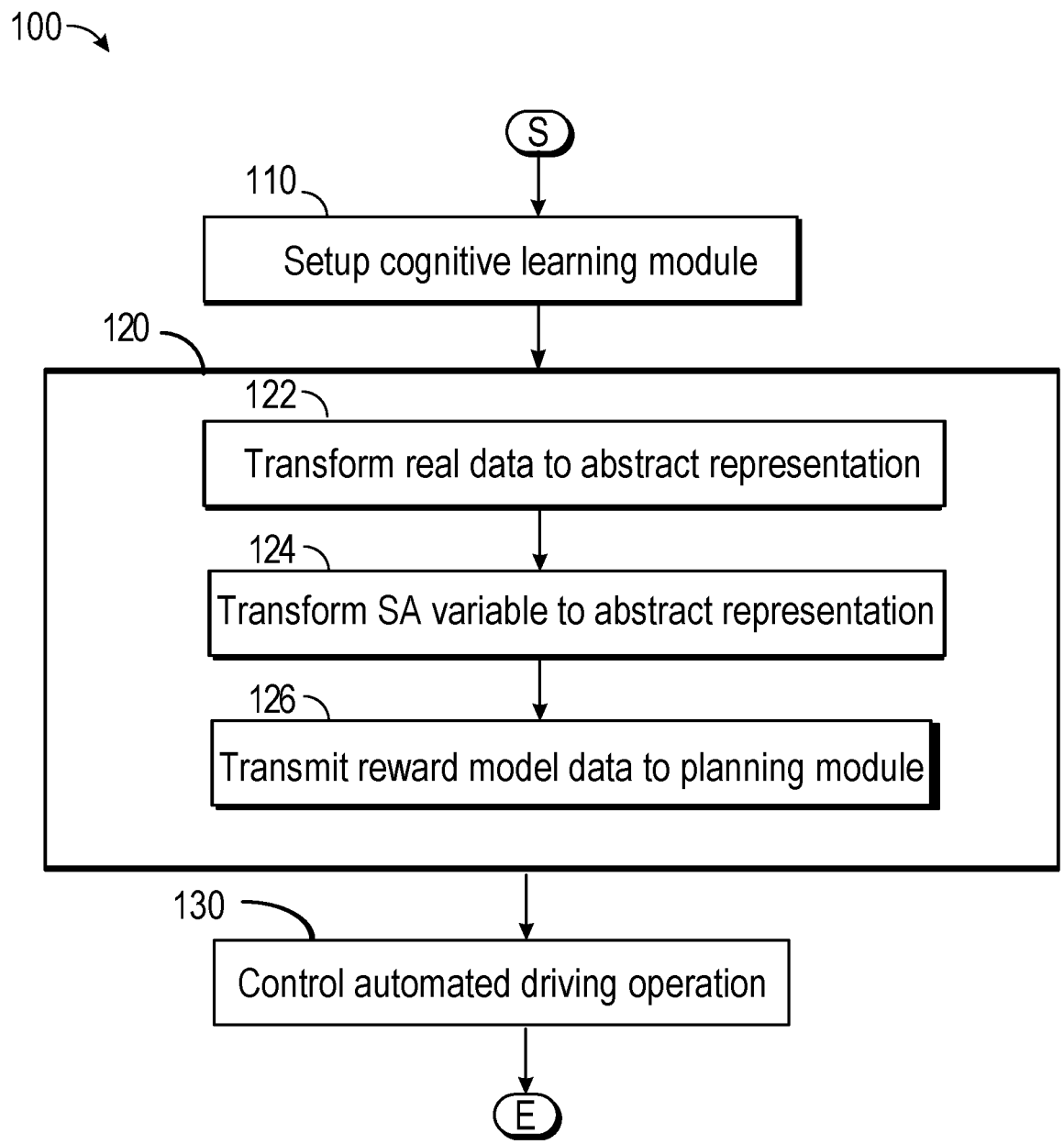
FIG. 2 is a flowchart for a method of operating the system of FIG. 1.

The system 10 employs independent models for executing vehicle planning and learning in the automated driving operation D. The computing unit 14 includes a cognitive-based learning model 20 in the learning stage 16 and a vehicle planning model 22 in the planning stage 18, both models being independent of one another. Cognitive-based models are an estimation of human cognitive processes for the purposes of comprehension and prediction. An example flowchart of a method 100 for operating the system 10 is shown in FIG. 2 and described below.

Current methods use the same problem representation or model for both the learning process and for the planning process. The system 10 enables efficient learning from human driving data by decoupling the model used for learning from the model used for planning. The vehicle planning model 22 acts in a general state/action space, supports a wide range of scenarios, and changes frequently during development life cycle. In some embodiments, the vehicle planning model 22 is non-cognitive. In contrast, the cognitive-based learning model 20 (referred to hereinafter as cognitive learning model 20) uses fewer representations of states and actions and is much simpler. Keeping two independent representations for the learning process and the planning process allows the vehicle planning model 22 and reward learning development life cycles to progress in parallel.

The system 10 provides a framework for interfacing between the cognitive learning model 20 and the vehicle planning model 22 and allows an offline learning of cognitive process. The computing unit 14 includes a semantic layer 24 adapted to act as a bridge between the cognitive learning model 20 and the vehicle planning model 22. As described below, the semantic layer 24 includes a first data adaptor A1 configured to transform real traffic data (e.g., from a database 26) to a respective equivalent abstract representation such that it can be used by the cognitive learning model 20 to generate a humanized reward model 30.

Referring to FIG. 1, the semantic layer 24 includes a second data adaptor A2 for transforming pairs of state and action variables to a respective equivalent abstract representation in the semantic layer 24, with the respective abstract representation being transmitted to the humanized reward model 30. The semantic layer 24 translates the reward function that was learned by the cognitive learning model 20 for transmission to the vehicle planning model 22, via a third data adaptor A3.

Referring to FIG. 1, the vehicle planning model 22 is adapted to determine a trajectory plan 32 based in part on the humanized reward model 30. The controller C is adapted to execute the automated driving operation D based in part on the trajectory plan 32. The trajectory plan 32 determines the appropriate steps for navigating traffic signs, intersections, expected and unexpected road and traffic conditions. The scenarios evaluated by the system 10 include roundabouts, lane changes, unprotected left turn, passing merge scenarios, behavior around pedestrians, etc. The vehicle 12 may include multiple sensors (not shown) for perceiving the surrounding environment. Data from the sensors is transmitted to the controller C for use by the vehicle planning model and others. The vehicle sensors may incorporate various types of technology available to those skilled in the art, such as radar, camera, sonic or LIDAR unit and an inertial measurement unit.

In some embodiments, the computing unit 14 is remotely located as part of an off-board cloud computing service, referred to herein as cloud unit 34. The cloud unit 34 may include one or more servers hosted on the Internet to store, manage, and process data, maintained by an organization, such as for example, a research institute or a company. The cloud unit 34 may be at least partially managed by personnel at various locations. The cloud unit 34 may be a private or public source of information maintained by an organization, such as for example, a research institute, a company, a university and/or a hospital.

In other embodiments, the computing unit 14 may run on a mobile application 36 that is embedded in a smart device belonging to a user of the vehicle 12. The mobile application 36 may be linked to the vehicle 12, e.g., as part of the vehicle infotainment system. The circuitry and components of a mobile application 36 ("apps") available to those skilled in the art may be employed.

Referring to FIG. 1, the controller C may be configured to communicate with the computing unit 14 via a wireless network 40. The wireless network 40 of FIG. 1 may be a short-range network or a long-range network. The wireless network 40 may be a communication BUS, which may be in the form of a serial Controller Area Network (CAN-BUS). The wireless network 40 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

Referring now to FIG. 2, an example flowchart of a method 100 for controlling the automated driving operation is shown. Method 100 may be embodied as computer-readable code or instructions stored on and at least partially executable by the controller C and/or computing unit 14 of FIG. 1. Method 100 need not be applied in the specific order recited herein. Furthermore, it is to be understood that some blocks or steps may be eliminated. Method 100 may be executed in real-time, continuously, systematically, sporadically and/or at regular intervals, for example, each 10 milliseconds during normal and ongoing operation of the vehicle 12.

Per block 110 of FIG. 2, the controller C is programmed to setup a cognitive learning model 20. A cognitive model is an estimation of human cognitive processes for the purposes of comprehension and prediction. The cognitive learning model 20 uses small representations of states and actions and is designed for capturing human behavior and the issues that affect it. The cognitive learning model 20 may employ quantile-binning to discretize state features (from a predetermined group of states) into action variables.

The specific type of model used by the cognitive learning model 20 may be varied based on the application at hand. In one embodiment, the cognitive learning model 20 incorporates automated abstraction methods. In another embodiment, the cognitive learning model 20 includes dimensionality reduction methods. The cognitive learning model 20 may incorporate an inverse reinforcement learning model. In another embodiment, the cognitive learning model 20 may incorporate a two-alternative forced choice model or a multiple-alternative forced choice model.

In yet another embodiment, the cognitive learning model 20 incorporates a neural network with an activation function in an output layer, the activation function predicting a multinomial probability distribution. As understood by those skilled in the art, neural networks are designed to recognize patterns from real-world data (e.g. images, sound, text, time series and others), translate or convert them into numerical form and embed in vectors or matrices. The neural network may employ deep learning maps to match an input vector x to an output vector y. In other words, the neural network learns an activation function $f$ such that $f(x)$ maps to y. The training process enables the neural network to correlate the appropriate activation function $f(x)$ for transforming the input vector x to the output vector y. In the case of a simple linear regression model, two parameters are learned: a bias and a slope. The bias is the level of the output vector y when the input vector x is 0 and the slope is the rate of predicted increase or decrease in the output vector y for each unit increase in the input vector x.

Proceeding to block 120 of FIG. 2, the controller C is programmed to set up a semantic layer 24, including first, second and third data adaptors A1, A2 and A3. Block 120 includes sub-blocks 122, 124 and 126. The semantic layer 24 may be configured to employ a Markov Decision Process. As understood by those skilled in the art, a Markov decision process is a discrete-time stochastic control process providing a mathematical framework for decision modeling. The Markov Decision Process (MDP) model is used to learn reward from a human driver. The semantic layer 24 translates the original Markov Decision Process variables (e.g., <S, A, T, R>) to an abstract representation (e.g., $S\widetilde{MDP}=<\tilde{S}, \tilde{A}, \tilde{T}, \tilde{R}>$).

Per sub-block 122, the method 100 includes transforming real traffic data (e.g., from a database 26) to a respective equivalent abstract representation, via the first data adaptor A1, such that it can be used by the cognitive learning model 20 to generate a humanized reward model 30. The cognitive learning model 20 creates abstraction of the task, states and actions which is helpful for learning from the available data. The first adaptor A1 translates from temporal data of human behavior into the semantic space. Real data can be raw visual or tracked, the first adapter A1 converts the sequential data of states and human behavior into an abstraction defined by the cognitive semantic space, based on the model chosen for the cognitive learning model 20.

Per sub-block 124, the method 100 includes obtaining pairs of state and action variables for the vehicle 12, via the vehicle planning model 22. The pairs of state and action variables are transformed to respective equivalent abstract representation in the semantic layer 24, via the second data adaptor A2. The respective equivalent abstract representation is then transmitted to the humanized reward model 30. The reward function $R(s,a)=\Sigma\beta iFi(s, a)$ may be approximated by $\tilde{R}(\tilde{s}, \tilde{a})=\Sigma\beta i \tilde{F}\iota(\tilde{s}, \tilde{a})$, where s is a state vector and a is an action variable. The semantic MDP is intended for a simple and more efficient learning of human behavior. The reward may be expressed in the form of a numerical score for each potential action.

Per sub-block 126, the method 100 includes transmitting the respective data from the humanized reward model 30 to the vehicle planning model 22, via the third data adaptor A3. In other words, the learned knowledge (e.g., reward function, probability distribution etc.) is sent to the vehicle planning model 22.

Advancing to block 130 of FIG. 2, the controller C is programmed to control the automated driving operation D of the vehicle 12 based in part on the trajectory plan 32, which generates an optimized trajectory plan based on vehicle state and dynamics, data pertaining to neighboring vehicles and road conditions, sensor data and training imparted by the cognitive learning model 20. The recommended travel path for the vehicle 12 may be updated based on modelled and real-time data.

Figure 3:
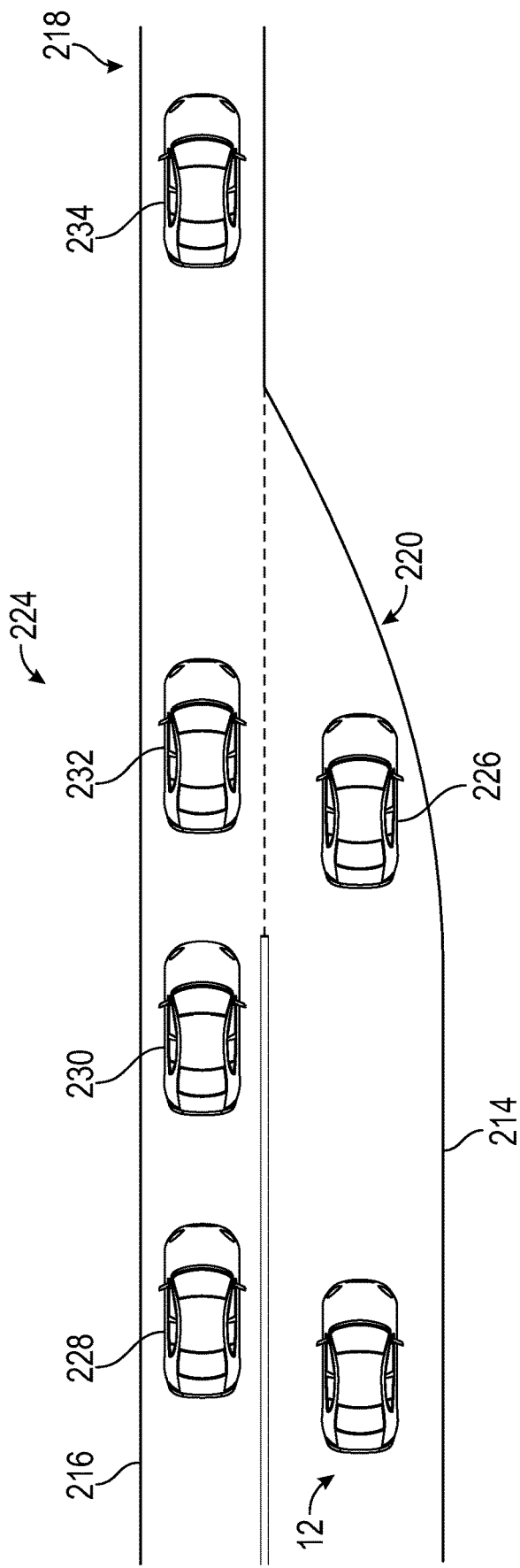
FIG. 3 is a schematic fragmentary diagram illustrating an example scenario faced by the vehicle of FIG. 1.

Referring now to FIG. 3, a lane merge scenario faced by the vehicle 12 is shown. The vehicle 12 in FIG. 3 is positioned in a first lane 214 which is in the vicinity of a second lane 216. The first lane 214 and the second lane 216 merge into a single road 218 at a merging trajectory location 220. A merging trajectory location 220 may occur where two lanes physically merge into one lane or in an unstructured traffic scenario. Referring to FIG. 3, the vehicle 12 is in the vicinity of one or more neighboring vehicles 224. The neighboring vehicles 224 may be in the same lane as the vehicle 12 or in an adjacent or nearby lane, such as car 226 in the first lane 214 and cars 228, 230, 232 and 234 in the second lane 216.

The merging trajectory location 220 defines a sequence of gaps between pairs of vehicles for every time step. A default-gap(t) is the pair of vehicles (lead/lag) where vehicle 12 is expected to merge. The features tracked by the vehicle sensors may include a respective gap length between the neighboring vehicles 224 and vehicle 12, changes in the respective gap lengths between each of the neighboring vehicles 224, acceleration of the neighboring vehicles 224 in the gap, respective time to collision, and relative velocity of a leader vehicle in the same lane (e.g., car 226). Under a set of assumptions such as constant speed or acceleration, the action space may be categorized with the following options: decelerate, stay, accelerate.

In one example, the cognitive learning model 20 incorporates a Softmax function, which may be used as the activation function in the output layer of neural network models that predict a multinomial probability distribution. The output of the Softmax function is a vector with probabilities of each possible outcome. The first adaptor A1 transforms trajectories of real recordings (e.g., from NGSIM i80 data) into action sequences of gap-order and take/skip. The second adaptor A2 transforms planner scene state representation into sequences categorized as gap-order and take/skip. The third adaptor A3 transforms distribution of normalized probability (take|state) of action into a single reward number, for example taking the mean, or a 25% percentile of the distribution.

Another example scenario faced by the vehicle 12 is a lane change. Here, the cognitive learning model 20 may incorporate inverse reinforcement learning using the maximum entropy algorithm, as understood by those skilled in the art. The first adaptor A1 of the semantic layer 24 transforms human driving recordings of human drivers changing lanes and state representations (as a set of relative velocities and distances sequences). The second adaptor A2 transforms the planner scene state representation into state encoding and whether a lane change was made or not. The third adaptor A3 transforms an approximated reward of (state, action) into planner reward.

The first feature to be tracked by vehicle sensors include relative speed leader and potential leader vehicle, the second feature may include relative speed of the vehicle 12 and neighboring vehicles. The third feature may include the distance of the vehicle 12 from potential follower vehicles and a potential leader vehicle. A first possible driving action includes staying the lane and a second possible driving action is to change lanes (action/space). Here, selecting the trajectory or possible driving action may include implementing Markov decision making. The reward function outputs a corresponding negative or positive reward for each corresponding driving action, incorporating learning from human behavior.

In summary, the system 10 (via execution of the method 100) adds a "human factor" to vehicle planning. The system 10 decouples the vehicle planning representation from the learning/training representation when learning reward function from human data by using a semantic layer 24. This allows the cognitive learning model and the planning model to be designed independently. The semantic layer 24 translates/bridges between the two representations by implementation of three adaptors that convert pairs of (state, action) from traffic data or from the vehicle planning data to an equivalent abstract representation, such that it can be used and evaluated by the cognitive learning model 20. The system 10 enables harnessing of the compactness and semantics of cognitive models for learning from human behavior while enabling the integration of the learned knowledge into a general model used by the vehicle planning model 22.

The controller C of FIG. 1 may be an integral portion of, or a separate module operatively connected to, other controllers of the vehicle 12. In one example, the controller C may be an electronic control unit (ECU) of the vehicle 12. The memory M can store controller-executable instruction sets, and the processor P can execute the controller-executable instruction sets stored in the memory M.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowchart in FIG. 2 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for controlling an automated driving operation of a vehicle having a controller with a processor and tangible, non-transitory memory, the method comprising:
setting up respective independent models for executing planning and learning in the automated driving operation, including a vehicle planning model and a cognitive learning model;
generating a semantic layer to act as a bridge between the cognitive learning model and the vehicle planning model, the vehicle planning model being decoupled from the cognitive learning model, the semantic layer including a first data adaptor and a second data adaptor;
obtaining real traffic data;
transforming the real traffic data to a respective equivalent abstract representation such that it can be used by the cognitive learning model to generate a humanized reward model, via the first data adaptor;
obtaining pairs of state and action variables for the vehicle, via the vehicle planning model;

transforming the pairs of state and action variables to the respective equivalent abstract representation in the semantic layer, via the second data adaptor, the respective equivalent abstract representation being transmitted to the humanized reward model;

employing quantile-binning in the cognitive learning model to discretize state features from a predetermined group of states into action variables;

determining a trajectory plan, via the vehicle planning model, based in part on the humanized reward model; and executing, via the controller, the automated driving operation based in part on the trajectory plan.

2. The method of claim 1, further comprising:
incorporating a third data adaptor in the semantic layer; and
transmitting respective data from the humanized reward model to the vehicle planning model, via the third data adaptor.

3. The method of claim 2, further comprising:
incorporating an inverse reinforcement learning model in the cognitive learning model; and
transforming human driving data involving respective lane change scenarios into respective state representations, including respective sets of relative velocities and distances sequences, via the first adaptor.

4. The method of claim 3, further comprising:
transforming respective planner scene state representations into respective state encoding, via the second adaptor, wherein the respective planner scene state representations include whether a lane change was made in the human driving data.

5. The method of claim 1, further comprising:
employing a Markov Decision Process model in the semantic layer.

6. The method of claim 1, further comprising:
incorporating a two-alternative forced choice model or a multiple-alternative forced choice model in the cognitive learning model.

7. The method of claim 1, further comprising:
incorporating an inverse reinforcement learning model in the cognitive learning model.

8. The method of claim 1, further comprising:
incorporating a neural network in the cognitive learning model with an activation function in an output layer, the activation function predicting a multinomial probability distribution.

9. The method of claim 1, further comprising:
hosting the cognitive learning model and the semantic layer in an off-board cloud computing service.

10. A system for controlling an automated driving operation in a vehicle, the system comprising:
a controller operatively connected to the vehicle, the controller having a processor and tangible, non-transitory memory on which instructions are recorded;
a computing unit in communication with the controller and having respective independent models for executing planning and learning in the automated driving operation, including a vehicle planning model and a cognitive learning model;
wherein the computing unit includes a semantic layer adapted to act as a bridge between the cognitive learning model and the vehicle planning model, the vehicle planning model being decoupled from the cognitive learning model, the semantic layer including a first data adaptor and a second data adaptor;
wherein the first data adaptor is configured to transform real traffic data to a respective equivalent abstract representation such that it can be used by the cognitive learning model to generate a humanized reward model;
wherein the vehicle planning model is adapted to determine a trajectory plan based in part on the humanized reward model and obtain pairs of state and action variables for the vehicle;
wherein the second data adaptor is adapted to transform the pairs of state and action variables to the respective equivalent abstract representation in the semantic layer, the respective equivalent abstract representation being transmitted to the humanized reward model;
wherein the cognitive learning model employs quantile-binning to discretize state features predetermined group of states into action variables; and
wherein the controller is adapted to execute the automated driving operation based in part on the trajectory plan.

11. The system of claim 10, wherein the semantic layer includes a third data adaptor configured to transmit respective data from the humanized reward model to the vehicle planning model.

12. The system of claim 10, wherein the semantic layer is configured to employ a Markov Decision Process model.

13. The system of claim 10, wherein the cognitive learning model incorporates a two-alternative forced choice model or a multiple-alternative forced choice model.

14. The system of claim 10, wherein the cognitive learning model incorporates an inverse reinforcement learning model.

15. The system of claim 10, wherein the cognitive learning model incorporates a neural network with an activation function in an output layer, the activation function predicting a multinomial probability distribution.

* * * * *